United States Patent Office 3,736,303
Patented May 29, 1973

3,736,303
VINYLIDENE CHLORIDE COPOLYMER
David R. Smith and Howard Peterson, Decatur, Ill., assignors to A. E. Staley Manufacturing Company, Decatur, Ill.
No Drawing. Continuation of abandoned application Ser. No. 819,957, Apr. 28, 1969. This application June 24, 1971, Ser. No. 156,479
Int. Cl. C08f 15/40, 37/00
U.S. Cl. 260—79.3 M
3 Claims

ABSTRACT OF THE DISCLOSURE

A stable polyvinylidene chloride latex composition suitable for coating substrates, particularly unprimed polyethylene and polypropylene, comprising a copolymer of (A) 70 to 95% by weight vinylidene chloride, (B) 0.1 to 3% by weight ethylenically unsaturated sulfur acid having sulfur in valence state 6, (C) 0 to 5% by weight ethylenically unsaturated carboxylic acid and (D) 2 to 29.9% by weight ethylenically unsaturated monomer other than (A), (B) or (C).

---

This is a streamlined continuation of U.S. patent application Ser. No. 819,957 filed Apr. 28, 1969 and now abandoned.

DISCLOSURE OF THE INVENTION

This invention relates to a stable polyvinylidene chloride latex composition suitable for coating substrates, particularly unprimed polyethylene and polypropylene, comprising a copolymer of (A) 70 to 95% by weight vinylidene chloride, (B) 0.1 to 3% by weight ethylenically unsaturated sulfur acid having sulfur in valence state 6, (C) 0 to 5% by weight ethylenically unsaturated carboxylic acid and (D) 2 to 29.9% by weight ethylenically unsaturated monomer other than (A), (B), or (C).

Polyvinylidene chloride polymers have been found suitable for coating paper, metals, plastics, etc. since these polymers form protective coatings which are tough, inert, to a large number of chemicals, such as water, acids, oils and fats, and relatively impermeable to many gases. In general, it is preferred to apply the polyvinylidene chloride to the substrate in the form of a latex rather than from an organic solvent solution. In this way, one can avoid the use of expensive organic solvents, which are frequently inflammable or toxic.

It is generally considered that a polyvinylidene chloride latex should be applicable to a substrate at high total solids in order to minimize the amount of water that has to be removed from the substrate and the drying time. See for example, British Pat. 1,007,050, British Pat. 1,011,500, U.S. Pat. 2,894,927, etc. Inasmuch as most high speed coating operations require the use of low viscosity coating compositions, the polyvinylidene chloride latex should have a relatively low viscosity under the indicated conditions. This brings into play a number of interdependent factors, which require that the polyvinylidene chloride latex be prepared under carefully controlled conditions. As the polyvinylidene chloride polymer solids increase, the viscosity of the latex tends to increase and the stability of the latex decreases (i.e. the tendency for the latex to coagulate increases). The emulsion stability can be improved by increasing the concentration of emulsifier, particularly ionic emulsifier, used to prepare the latex polymer. However, the higher the concentration of emulsifier used to prepare the polyvinylidene chloride latex, the higher the concentration of polyvinylidene chloride particles in the emulsion and the smaller the particle size. See Canadian Pat. 723,207. At high solids, the viscosity of a polyvinylidene chloride latex increases as the number of polymer particles increases and/or as their particle size decreases. Further, as the emulsifier concentration increases, the water resistance and moisture vapor transmission resistance of the deposited latex film decreases.

It is also generally considered that a polyvinylidene chloride latex should have a relatively small particle size, less than about 0.3 micron, preferably no more than about 0.2 micron, in order to coalesce properly when deposited on a substrate. In order to keep polyvinylidene latex from forming a hazy coating, the aforementioned British patents indicate that it is desirable to employ polyvinylidene chloride latex having a wider particle size distribution than that which can be obtained by the polymerization process described in the 1,011,500 patent. The British patentees state that the polymerization process described in the 1,011,500 patent only produces emulsions having a particle size range of about 0.04 micron and that this drawback is overcome by blending two batches of polyvinylidene chloride latex, each with a different size. It is believed that a polydisperse system of this type levels better and coalesces more readily when applied to a substrate.

During the last two decades, polyethylene packaging films have met with great commercial success. These films are tough, semi-transparent, heat-sealable, resistant to many chemicals, inexpensive and exhibit a high degree of moisture vapor impermeability. More recently, polypropylene films have been used for substantially the same purpose for their high tensile strength albeit higher heat-sealing temperature. However, these polyolefin films are extremely permeable to the passage of greases (fats and oils). A greasy, aesthetically undesirable texture is imparted to polyolefin packages which detracts from the marketability of the package when polyolefin film is used to package meats, nut meats, potato chips and other materials which are greasy or tend to exude a greasy substance. Further, the oxygen permeability of polyolefin films, particularly polyethylene, is often undesirable since it decreases the storage life of perishable goods.

Polyvinylidene chloride latexes have been suggested for use in coating polyolefins in order to impart grease-resistance and oxygen-impermeability. However, polyvinylidene chloride latexes tend not to wet polyolefin substrates, particularly polyethylene and polypropylene, adequately and coatings deposited therefrom suffer from discontinuities and poor adhesion and are generally unsatisfactory for commercial use. Although surface active agents improve wetting, the anionic emulsifiers used to prepare latexes seem to act as release agents reducing the adhesion of the deposited film. Poor adhesion may be minimized, to some extent by priming the substrates with a subbing layer of a material that improves the adhesion of the substrate to the polyvinylidene chloride film deposited from aqueous emulsion. However, when a priming step is included, the apparent economic and technical advantages from coating aqueous emulsions are reduced or eliminated all together. For most uses, a heat-sealed, polyvinylidene chloride-polyolefin laminate should have a dynamic peel strength of at least 75 g./inch (preferably 100 g./inch) under ambient conditions and after aging at 100% relative humidity (R.H) for 16 hours.

British specifications 1,007,050 and 1,011,500 disclose coating substrates including unprimed polyethylene and polypropylene with polyvinylidene chloride latexes prepared by an emulsifier-free polymerization process. However, these polyvinylidene chloride latexes have reduced stability. For example, the patentee in British specification 1,011,500 indicates that emulsifier-free latexes at high solids are unstable and have limited shelf life due to the sedimentation of relatively large copolymer particles. British specification 1,011,500 states that small particle size (less than about 0.3 micron, preferably no more than about 0.2 micron) polyvinylidene chloride polymers of predetermined monomer content suitable for coating various unprimed substrates can be prepared with a particular redox catalyst system. The coating composition must contain less than 0.1% by weight ionic (anionic or cationic) emulsifier and less than 2% by weight nonionic emulsifier with the polymerization being preferably performed in the absence of all emulsifiers. The British Pat. 1,011,500 states that emulsifiers reduce the storage stability of the latex and that nonionics tend to cause excessive coagulum during polymerization. Since up to 2% by weight nonionic surface active agent improves the wetting properties of the latex, the patentee recommends adding nonionic emulsifier to the latex just prior to the coating operation. If more than 0.1% by weight of an ionic (anionic or cationic) emulsifier is used to prepare the polyvinylidene chloride latex, the adhesion of the coating to the substrate is impaired, i.e. the anionic surface active agent acts as a release agent.

The general object of this invention is to provide stable, vinylidene chloride copolymer latexes having excellent adhesion to substrates, such as unprimed polyethylene and polypropylene. Other objects will appear hereinafter.

The object of this invention has been attained with a vinylidene chloride copolymer latex comprising a copolymer of (A) 70 to 95% by weight vinylidene chloride, (B) 0.1 to 3% by weight ethylenically unsaturated sulfur acid having sulfur in valence state 6, (C) 0 to 5% by weight ethylenically unsaturated carboxylic acid and (D) 2 to 29.9% by weight ethylenically unsaturated monomer other than (A), (B) or (C). In contrast to prior art polyvinylidene chloride latexes, the products of this invention have excellent stability at high total solids and deposit films having excellent adhesion to unprimed polyolefin substrates.

The polyvinylidene chloride polymers of this invention are copolymers of from about 70 to 95% by weight vinylidene chloride, preferably 85 to 94% by weight vinylidene chloride. The minimum and maximum concentrations of vinylidene chloride in the copolymer depend upon the ultimate use of the copolymer latex and the comonomers used to prepare it. If less than about 5% by weight comonomer is present, the polymer tends to crystallize prematurely. Preferably at least about 6% by weight comonomer should be present. However, as the concentration of vinylidene chloride in the polymer decreases, the barrier resistance of the applied coating decreases. Accordingly, the comonomers should comprise from about 5 to 30% by weight of the polymer, and preferably 6 to 15% by weight, to obtain the proper balance.

The copolymerizable ethylenically unsaturated sulfur acid having sulfur in valence state 6 can comprise from about 0.1 to 3% of the copolymer, preferably 0.3 to 1.5%. This monomer is necessary in order to form stable, high solids, vinylidene chloride copolymer latexes of small particle size which have suitable adhesion to unprimed polyolefin substrates. The ethylenically unsaturated sulfur acid functions in the same manner as conventional non-polymerizable anionic emulsifiers during polymerization by promoting the formation of small particle size, stable, high-solids vinylidene chloride copolymer latexes. However, whereas the conventional non-polymerizable anionic emulsifiers, which tend to migrate to the interface between the polyolefin substrate and deposited film, act as release agents; the sulfur acid moieties in the vinylidene chloride polymer bond the deposited film to the polyolefin substrate. Other things being equal, as the concentration of ethylenically unsaturated sulfur acid increases, the particle size of the polymer latex decreases. Accordingly, it is preferable to use the minimum concentration of this monomer which provides a stable latex having the necessary adhesion to unprimed polyolefin substrates.

Suitable copolymerizable ethylenically unsaturated sulfur acids having sulfur in valence state 6 include any of the sulfoalkyl esters of alpha,beta-ethylenically unsaturated acids described in U.S. Pats. 3,147,301, 3,033,833, 2,914,499, 2,923,734 and 3,024,221, such as sulfoethyl acrylate, sodio sulfoethyl methacrylate, 3-sulfo-2-hydroxypropylmethacrylate, di(sulfoethyl) itaconate, ethyl sulfoethyl maleate, di(sulfoethyl) fumarate, etc.; bisulfate esters of hydroxy alkyl esters of alpha,beta-ethylenically unsaturated acids, such as bisulfate ester of ethylene glycol monomethacrylate, bisulfate ester of triethylene glycol monoacrylate, etc.

The copolymers of this invention can contain from 0 to 5% by weight copolymerizable ethylenically unsaturated carboxylic acid, preferably 0.2 to 2% by weight. This monomer enhances the stability of the latex, improves leveling and wetting of the substrate and aids in adhesion of the latex polymer to metal substrates. The optimum concentration of this monomer depends to some extent on the concentration of ethylenically unsaturated sulfur acid. Preferably, the total concentration of ethylenically unsaturated sulfur acid and copolymerizable ethylenically unsaturated carboxylic acid is between .5 and 5% by weight of the copolymer. Suitable ethylenically unsaturated carboxylic acids include acrylic acid, methacrylic acid, itaconic acid, monobutyl itaconate, itaconic anhydride, etc.

The copolymer contains from about 2 to 29.9% by weight of copolymerizable ethylenically unsaturated monomer containing no free acid groups, preferably in an amount ranging from 4 to 14.2% by weight. The copolymerizable ethylenically unsaturated monomer containing no free acid groups and the ethylenically unsaturated acid monomers together are necessary in order to prevent premature crystallization of the polymer prior to application and in order to impart the necessary flexibility and heat-sealing properties to the dried coating. If less than 2% by weight ethylenically unsaturated monomer containing no free acid groups is present, the polymer tends to crystallize prematurely. (Preferably at least about 4% by weight of this comonomer or mixture of comonomers should be present.)

Monoethylenically unsaturated comonomers containing no free acid groups suitable for copolymerization with vinylidene chloride and the copolymerizable ethylenically unsaturated acids include alkyl esters of alpha, beta-ethylenically unsaturated monocarboxylic acids containing from 1 to 18 carbon atoms in the alkyl group, such as methyl acrylate, ethyl acrylate, butyl acrylate, 2-ethyl hexyl acrylate, ethoxyethyl acrylate, methyl methacrylate, ethyl alpha-cyanoacrylate, etc.; alpha, beta-ethylenically unsaturated nitriles, such as acrylonitrile, methacrylonitrile, ethacrylonitrile, etc.; alpha, beta-ethylenically unsaturated amides, such as methacrylamide, acrylamide, etc.; monovinyl aromatics, such as styrene, vinyltoluene, etc.; vinyl halides, such as vinyl chloride, vinyl bromide, etc.; diesters of alpha, beta-ethylenically unsaturated dicarboxylic acids, such as dimethyl itaconate, diethyl fumarate, dimethyl maleate, etc.; alkyl vinyl ethers, such as methyl vinyl ether, ethyl vinyl ether, etc.; alkyl vinyl ketones, such as methyl vinyl ketone, etc. If desired, up to about 2% by weight of the monomers used to prepare the vinylidene chloride copolymer latexes of this invention can be copolymerizable diethylenically unsaturated comonomers, such as allyl crotonate, allyl acrylate, polyhydric alcohol esters of alpha, beta-ethylenically monocarboxylic acids, such as 1,3-butylene dimethacrylate, the diacrylate or dimethacrylate of glycol, diethylene glycol, triethylene glycol, etc.

Briefly, the vinylidene chloride copolymer latexes of this invention are prepared by forming an aqueous emulsion, adding the monomers to be polymerized and catalysts to the emulsion, followed by polymerizing said monomers.

The non-polymerizable dispersing agents or emulsifiers for use in this invention are the so-called anionic and nonionic surface active agents. Anionic surface active agents can be used in a concentration up to about 0.6 part by weight per 100 parts by weight of the polymerizable monomers, preferably in the range of 0.001 to 0.1 part by weight of the polymerizable monomers, in order to help yield the desired particle size polymers. Within the preferred range of 0.001 to 0.1 part by weight anionic non-polymerizable emulsifier, the polyvinylidene chloride latex of this invention has excellent adhesion to unprimed polyolefin film under both high humidity and low humidity conditions. As the concentration of anionic emulsifier increases from above 0.1 to 0.6 part by weight, the adhesion to unprimed polyethylene and polypropylene film under high humidity aging conditions decreases markedly. However, under ambient conditions, the adhesion is still good at about 0.6 part per 100 parts by weight monomers. Even higher concentrations of anionic emulsifiers (up to about 3 parts per 100 parts monomer) can be used to prepare latexes suitable for coating metals, nylon, polyesters, etc. Suitable anionic surface active agents include alkali metal salts of alkyl aryl sulfonates, such as sodium dodecyl benzene sulfonate, sodium diamyl naphthalene sulfonate, disodium 4-dodecyloxydi(benzenesulfonate), etc.; alkali metal salts of alkyl sulfates, such as sodium lauryl sulfate, sodium myristyl sulfate, etc.

Suitable nonionic surface active agents include the alkylaryl polyoxyethylene glycols and alkylpolyoxyethylene glycols containing from 4 to 18 carbon atoms in the alkyl group and from about 2 to 120 oxyethylene units. The nonionic emulsifiers can be used in a concentration up to about 3% of the total monomer weight, preferably from 0.2 to 1.5% in order to help yield the desired particle size polymers. However, best results have been obtained where the total concentration of non-polymerizable anionic emulsifier and nonionic emulsifier is less than about 1.6% by weight of the total monomer concentration. The most advantageous concentration will depend in part on the emulsifier or emulsifiers used, the concentration of ethylenically unsaturated sulfur acid, the monomers to be polymerized, the desired particle size, the initiator system, etc.

As polymerization catalysts, there may be used one or more of the peroxidic compounds known to act as free radical catalysts. The catalyst can be soluble in aqueous solutions of the emulsifier or soluble only in the monomer phase, or both. Among the useful catalysts for the present type of copolymerization are inorganic peroxides, organic peroxides and hydroperoxides. These include hydrogen peroxide, benzoyl peroxide, tertiary butyl hydroperoxide, diisopropyl benzene hydroperoxide, cumene hydroperoxide, caproyl peroxide, methyl ethyl ketone peroxide, etc. Other free-radical catalysts are also useful, such as azodiisobutyronitrile and other aliphatic azo compounds of the type having an acylic azo group and an aliphatic carbon atom on each nitrogen, at least one of which is tertiary. In part, the particular combination of monomers governs the selection of the catalysts since some monomers respond better to one variety than they do to another.

The amount of peroxidic catalysts required is about proportional to the concentration of monomers used. The usual range is 0.01% to 3% of catalysts with reference to the weight of the monomer mixture. The preferred range is about 0.10 to 1.0% while the range of 0.1–0.4% is usually best. The optimum amount of catalysts is determined in large part by the nature of the particular monomers selected, including impurities which accompany particular monomers. In general, it is preferred to use the lowest concentration of catalyst sufficient to give the desired rate of conversion since the higher the catalyst concentration, the lower the polymer's molecular weight and the poorer its barrier properties.

Frequently, a promoter for the catalysts is used to hasten the reaction at a sufficiently low temperature to avoid coagulation. The promoter may be a reducing agent and the combination with the peroxidic catalyst is frequently referred to as a "redox system." Many examples of such systems are known and the promoters include ascorbic acid, and soluble sulfites, hydrosulfites, sulfoxalates, thiosulfates, and bisulfites. Particular promoters are exemplified by sodium hydrosulfite, sodium metabisulfites, zinc or sodium formaldehyde sulfoxalate, in small concentrations, particularly ferrous ion in the form of ferrous ammonium sulfate at concentrations of a few parts of ferrous ion per million.

The amount of promoter required varies, as is known, with the free-radical initiator chosen and with the particular promoter. The emulsifying agent also affects somewhat the amount of catalyst used as does the particular monomers. At the outside, not more than 3% or less than 0.01% of promoter is used in these situations. The preferred range of ascorbic acid is at the low end of this range up to about 0.1% while sulfites are used preferably in an amount of 0.1% to 1%.

Polymerization is best effected below about 95° C. Preferred range is about 30 to 70° C. with the bottom portion of the range (30 to 45° C.) being preferred to initiate the polymerization. Slightly lower temperatures, down to 0° C., are permissible. After most of the monomers have been converted to polymer, temperatures even higher than 95° C. may be employed. During polymerization, the temperature can be controlled in part by the rate at which monomers are supplied and polymerized and/or by applied cooling.

The polymerization process can be carried out batchwise or continuously. It is possible to work entirely batchwise emulsifying the entire portion of monomers and proceeding with polymerization. It is usually advantageous, however, to start with part of the monomers to be polymerized and add more monomer or monomers as polymerization proceeds. Gradual or incremental addition of monomer (either continuous or periodic) is advantageous in reaching a high solids content with optimum control of reaction conditions. Gradual or incremental addition of ethylenically unsaturated sulfur acid is particularly advantageous since this promotes the formation of additional micelles facilitating the formation of a polydisperse emulsion polymer. Catalyst or components of the redox system catalyst may be added as the polymerization proceeds and these can be used to control the speed of reaction to avoid over heating. In those cases where gradual or delayed addition of monomer is employed, it is also desirable to use part or all of the emulsifier to emulsify the monomers prior to the addition to the polymerization zone and/or to form a seed latex. Initiation of the polymerization reaction in the presence of seed latex is advantageous since it reduces the polymerization induction periods and lessens any tendency of a latex to coagulate in the initial stages.

In some cases, it may be desirable to a add preformed latex polymer particles to the polymerization reaction after the reaction becomes exothermic in the manner described in U.S. Pat. 3,424,706. This method is particularly useful for forming polydisperse polyvinylidene chloride latexes when the polymerization reaction is carried out batchwise except for the addition of preformed latex polymer particles.

One method of preparing the vinylidene chloride polymers of this invention comprises the steps of (1) initiating the polymerization of vinylidene chloride in the presence of preformed addition polymer in latex form having an average diameter less than the average diameter of the ultimate polydisperse polyvinylidene chloride polymer (0.01 to 0.12 micron), (2) adding additional monomer, which may be emulsified, at a predetermined rate and polymerizing said monomers and (3) terminating the polymerization at a predetermined solids content usually in the range of about 50 to 65% total solids.

The resultant vinylidene chloride latexes of this invention can be used to coat various substrates, such as unprimed polyolefins, primed polyolefins, aluminum foil, paper, glassine, etc. In some cases, particularly for coating unprimed polyolefins, it is desirable to reduce the surface tension of the latex by adding suitable nonionic surface active agents of the type described above and/or volatile alcohols, such as isopropanol, butanol, etc. to improve wetting.

The following examples are merely illustrative and should not be construed as limiting the scope of the invention.

In the examples to follow, peel strength of the polyolefin polyvinylidene chloride laminate was determined by coating the polyvinylidene chloride latex on polyolefin substrate using a wire wrapped rod. After the latex air dried to a film at room temperature, the polyvinylidene chloride side of the laminate was brought into face-to-face contact and heat sealed at 270° F. for one second at 40 p.s.i. After standing at room temperature under ambient conditions or after aging at 100% relative humidity for 16 hours, the peel strength of the heat seal was determined on an Instron Tester.

EXAMPLE 1

The following premixtures were prepared to be used in the preparation of a polyvinylidene chloride latex:

Emulsifier-monomer premixture: Parts (wet weight)
- Vinylidene chloride _____ 8,640
- Methyl acrylate _____ 816
- Acrylic acid _____ 96
- Sodio 2-sulfoethyl methacrylate (8% dry solids) _____ 600
- Igepal CO–880 (20% dry solids) _____ 240
- Brij 35 (20% dry solids) _____ 120
- Sodium lauryl sulfate (20% dry solids) ____ 24
- $Na_2HPO_4$ (6% dry solids) _____ 100
- Water _____ 1,322

Reactor charge:
- $NaH_2PO_4 \cdot H_2O$ _____ 4.8
- Brij 35 (20% solids) (lauryloxypolyoxyethylene glycol) _____ 40
- 2% by weight $H_2O_2$ _____ 160
- Seed latex (20% dry solids) _____ 240
- Water _____ 4,000

Promoter:
- Ascorbic acid _____ 10
- Water _____ 990

Additional catalyst:
- 2% by weight $H_2O_2$ _____ 400

A water cooled stainless steel reactor was charged with the above-described charge and 23.88 parts by weight of the emulsifier-monomer premixture. After the temperature was adjusted to 30° C., promoter was added to the reactor at a rate of 8.96 parts by weight per hour. After about 20 minutes, the addition of emulsifier-monomer premixture was started at the rate of about 35.83 parts per hour. The temperature was maintained at between 40 to 50° C. by cooling and adjusting the rate of addition of emulsifier-monomer premixture, promoter and additional catalyst. After about 9 hours, the reaction temperature was raised to 70° C. to complete the polymerization.

The undiluted 55% solids polyvinylidene chloride latex containing about 0.06 part by weight sodium lauryl sulfate per 100 parts by weight monomer was coated on corona discharge treated polypropylene. The laminate had a dynamic peel strength of 90 grams per inch at ambient conditions and after aging at 100% relative humidity. Essentially the same results are obtained using unprimed polyethylene.

The seed latex used in this example was prepared by charging a water-cooled stainless steel reactor with 0.2 part by weight $NaH_2PO_4 \cdot H_2O$, 600 parts by weight water, 10 parts by weight 2% $H_2O_2$ and 40 parts by weight of an emulsifier composition composed of equal parts by weight of Igepal CO–880 (20% dry solids) and sodium lauryl sulfate (20% dry solids). Two hundred and eighty parts by weight of an emulsifier monomer composition containing 177 parts by weight vinylidene chloride, 20 parts by weight methyl acrylate, 3 parts by weight acrylic acid, 25 parts by weight sodio 2-sulfoethyl methacrylate (8% solids), 10 parts by weight Igepal CO–880 (20% solids), 10 parts by weight sodium lauryl sulfate (20% solids) and 35 parts by weight water was added to the reactor at a rate of 1.3 parts per minute. At the same time, 30 parts by weight ascorbic acid (1% by weight dry solids) was added while maintaining the temperature at between 40 to 45° C. The seed latex was cooled, post-stabilized with 10 parts by weight Igepal CO–880 (20% solids) and 10 parts by weight sodium lauryl sulfate (20% solids) and diluted with water to form a 20% solids composition.

When this example was repeated without using any sodio sulfoethyl methacrylate in the seed latex and emulsifier-monomer premixture, the latex coagulated.

EXAMPLE 2

This example illustrates the effect of wetting agents on the peel strength of the polyvinylidene chloride latex of Example 1. The data are set forth below in Table I.

TABLE I

| Wetting agent | Parts wetting agent per 100 parts by wt. polymer solids | Peel strength | | | |
|---|---|---|---|---|---|
| | | Ambient aged | | 100% R.H.–16 hrs. | |
| | | Peak | Dynamic | Peak | Dynamic |
| None | | 300 | 90 | 210 | 90 |
| Sodium lauryl sulfate | .18 | 325 | 70 | 120 | 30 |
| Lauryloxypolyoxyethylene glycol (Brij 35) | .18 | 470 | 175 | 285 | 90 |
| Igepal CO–630 | .18 | 400 | 145 | 210 | 95 |
| Siponic ET 10 (polyoxyethylene thioether) | .18 | 820 | 250 | 615 | 130 |
| Siponic SK (polyoxyethylene thioether) | .18 | 760 | 225 | 560 | 120 |
| Igepal CO–630 | .36 | 790 | 235 | 585 | 170 |
| Brij 35 | .36 | 815 | 250 | 570 | 140 |
| Butanol | 3.6 | 730 | 265 | 545 | 150 |

The above data illustrate that the adhesion of the polymeric latexes of this invention to unprimed polypropylene is improved by the addition of nonionic wetting agents and that the presence of 0.25 part anionic surface active agent per 100 parts by weight monomer markedly decreases the high humidity adhesion of the laminate.

EXAMPLE 3

This example illustrates the preparation of a polyvinylidene chloride latex, containing over 0.5 part by weight anionic emulsifier per 100 parts monomer, which has good ambient temperature adhesion to unprimed polypropylene. The following premixtures were prepared:

Emulsifier-monomer premixture: Parts (wet weight)
- Vinylidene chloride _____ 9,050
- Methyl acrylate _____ 800
- Methacrylic acid _____ 100
- 1,3-butylene dimethacrylate _____ 50
- Sodio 2 - sulfoethyl methacrylate (8% dry solids) _____ 625
- Igepal CO–880 (20% dry solids) _____ 210
- Sodium lauryl sulfate (20% dry solids) ____ 250
- $Na_2HPO_4$ (6% dry solids) _____ 100
- Water _____ 1,300

Reactor charge:
- NaH₂PO₄·H₂O _____ 4.8
- Igepal CO-880 (20% dry solids) _____ 40
- 2% H₂O₂ _____ 160
- Seed latex (20% dry solids) _____ 240
- Water _____ 4,000

Promoter:
- Ascorbic acid _____ 10
- Water _____ 990

Additional catalyst:
- 2% by weight hydrogen peroxide _____ 400

The deposited polymer latex, prepared in the manner described in Example 1 with the seed latex of Example 1, had an ambient dynamic peel strength on polypropylene of 75 grams per inch and a dynamic peel strength after aging at 100% relative humidity for 16 hours of 30 grams per inch.

The deposited latex of this example has excellent adhesion to aluminum foil.

Since many embodiments of this invention may be made and since many changes may be made in the embodiments described, the foregoing is to be interpreted as illustrative only, and our invention is defined by the claims appended hereafter.

What is claimed is:

1. A vinylidene chloride emulsion copolymer, suitable for coating substrates, said copolymer consisting essentially of (A) 70 to 95% by weight of copolymerized vinylidene chloride, (B) 0.1 to 3% by weight of copolymerized sulfoalkyl ester of an alpha, beta-ethylenically unsaturated acid having sulfur in valence state 6, (C) 0.2 to 5% by weight of copolymerized ethylenically unsaturated carboxylic acid and (D) 2 to 39.9% by weight of copolymerized ethylenically unsaturated monomer containing no free acid groups and other than (A), (B), or (C).

2. The vinylidene chloride copolymer of claim 1 wherein said copolymerized sulfoalkyl ester comprises sulfoethyl methacrylate.

3. The vinylidene chloride copolymer of claim 2 wherein said copolymerized sulfoalkyl ester comprises sodi-2-sulfoethyl methacrylate.

References Cited
UNITED STATES PATENTS 3,617,368  5/1972  Gibbs et al. _____ 117—161 UT
3,449,302  6/1969  Nachbur et al. _____ 260—79.3

MELVIN GOLDSTEIN, Primary Examiner

U.S. Cl. X.R.

117—138.8 E; 161—254; 260—29.6 SQ, 29.6 TA

UNITED STATES PATENT OFFICE
CERTIFICATE OF CORRECTION

Patent No. 3,736,303          Dated May 29, 1973

Inventor(s) David R. Smith and Howard Peterson

It is certified that error appears in the above-identified patent and that said Letters Patent are hereby corrected as shown below:

Column 6, line 51, for "to a add" read ---to add---
Column 8, line 54, for "0.25" read ---0.24---
Column 10, line 7, for "39.9% read ---29.9%---

Signed and sealed this 7th day of May 1974.

(SEAL)
Attest:

EDWARD M.FLETCHER,JR.          C. MARSHALL DANN
Attesting Officer          Commissioner of Patents